UNITED STATES PATENT OFFICE.

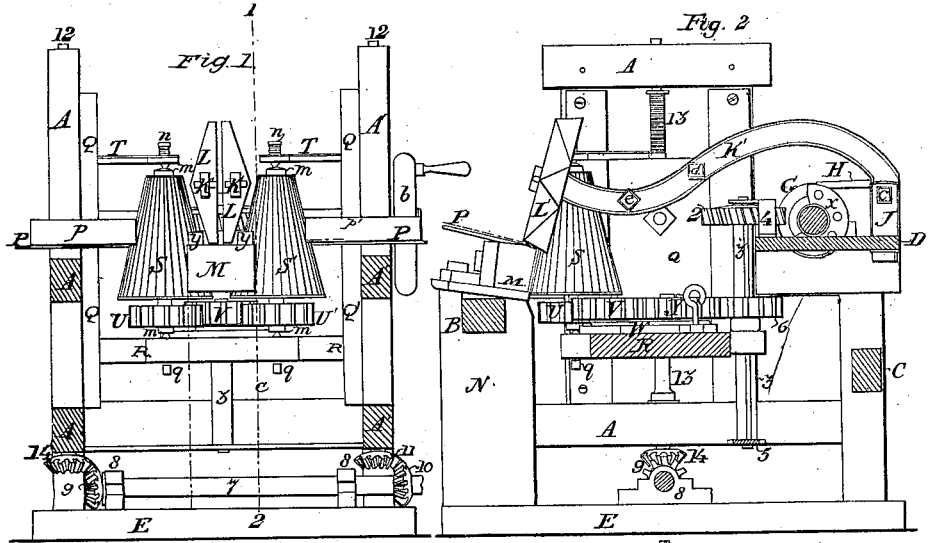
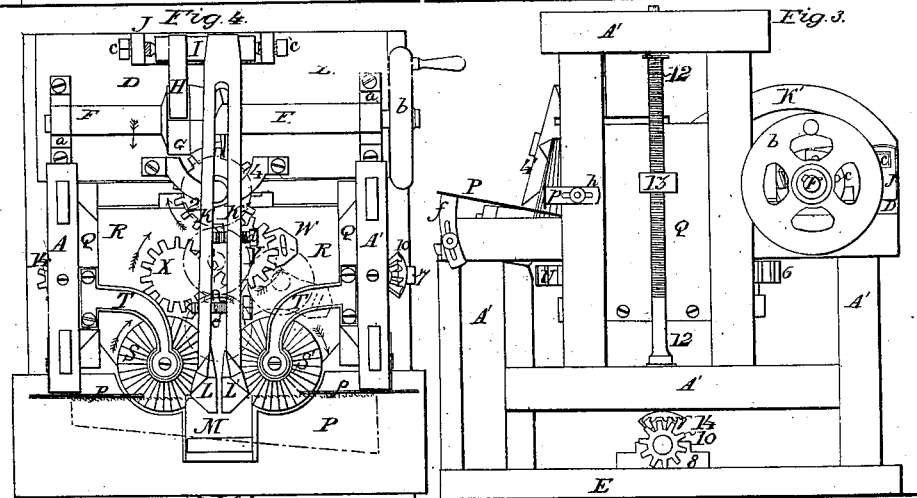
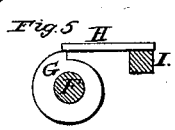
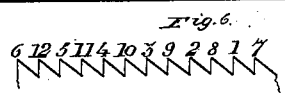

THOMAS S. DISSTON AND HENRY DISSTON, OF PHILADELPHIA, PENNSYLVANIA.

MACHINE FOR SETTING SAW-TEETH.

Specification of Letters Patent No. 29,772, dated August 28, 1860.

*To all whom it may concern:*

Be it known that we, THOMAS S. DISSTON and HENRY DISSTON, both of the city of Philadelphia and State of Pennsylvania, have invented a new and Improved Machine for Setting the Teeth of Saws; and we do hereby declare the following to be a full, clear, and exact description of the same, reference being had to the accompanying drawing and to the letters of reference marked thereon.

Our invention relates to mechanism by which the teeth of saws may have the proper bend or set imparted to them with a rapidity and precision which cannot be attained by the usual tedious manipulation heretofore practiced for accomplishing the same result, and our invention consists firstly, in causing a saw blade to traverse over an anvil by means of rotating conical cog wheels which are rendered adjustable vertically in respect to the platform on which the saw is placed so that the said conical wheels may be readily brought to act on saw blades with either coarse or fine teeth, as fully explained hereafter; secondly, in employing in combination with the said conical cog-wheels two or more hammers moving simultaneously and being so arranged and furnished with such adjusting appliances that the heads of the hammers may be adjusted in respect to each other and to the said conical cog wheels, thereby affording facilities for altering the hammer so as to suit saw teeth of different sizes and so as to strike the teeth at the proper points, and each tooth one or more blows; thirdly, in a platform so secured to the frame and rendered adjustable thereon that more or less bend may be imparted to the teeth of the saw blade placed on the said platform as described hereafter; fourthly, in certain guide plates arranged in respect to the above mentioned platform and rendered adjustable on the frame as and for the purpose described hereafter; fifthly, in a combination of an adjustable anvil with the above mentioned conical cog wheels.

In order to enable others skilled in the art to make and use our invention we will now proceed to describe its construction and operation.

On reference to the accompanying drawing which forms a part of this specification Figure 1, is a front view of our improved saw setting machine with part of the framework removed. Fig. 2, a sectional elevation on the line 1, 2, Fig. 1. Fig. 3, a side view of the machine. Fig. 4 a ground plan. Fig. 5, a detached view of part of the machine, and Fig. 6, a diagram illustrating the action of the machine on the teeth of a saw.

Similar letters refer to similar parts throughout the several views.

A and A' are the two side frames of the machine connected together by the front cross bar B, the rear cross bar C and the platform D, and secured permanently to a suitable base E.

F is the driving shaft turning in suitable boxes $a$ $a$ on the platform D and furnished at one end with a handled flywheel $b$ or other suitable driving apparatus.

On the driving shaft F is a cam G the form of which will be best observed on reference to the detached view Fig. 5, the edge of the cam being arranged to bear against the under side of an arm H which is secured to or forms a part of the rock shaft I, the latter being hung to the points of set screws $c$, $c$, on a plate J which is secured to the platform D. To the same rock shaft I is secured the helve of the hammer, this helve consisting of two curved bars K and K' held together near the point where they are connected to the rock shaft but separate from each other from this point outward with the exception of the connection afforded by the set screws $d$, $e$ the former of which screws into the bar K' of the helve and bears with its point against the bar K, the screw $e$ passing freely through the bar K' (against which its head bears) and screwing into the bar K.

A head L is attached to the half K of the helve, and a head L' is attached to the other half K' of the helve. These heads are inclined at the lower ends as seen in Fig. 2, and are arranged to strike against the inclined edge of the anvil M the latter being attached to a plate M' which rests on and is secured to the anvil block N by means of a bolt $g$ which passes through an oblong slot in the plate so that the latter can be adjusted at pleasure and secured after adjustment.

P is a platform near each end of which is a curved plate $f$, one bearing against the outside of one frame A and the other against the outside of the opposite frame A', a set screw passing through a curved slot in each plate and screwing into the frame.

Two guide plates $p$ and $p'$ are secured, one to one frame and the other to the opposite frame of the machine by means of set screws which pass through oblong slots in projections h on the said plates so that the latter can be adjusted at pleasure.

It will be observed that the platform P has an opening so as to be clear of the anvil M and the heads of the hammer.

The movable frame of the machine consists of the two vertical plates Q and Q' connected together at the bottom by the cross plate or platform R.

The plate Q has V shaped edges adapted to V shaped guides on the inside of the frame A, and the plate Q' has similar edges adapted to similar guides on the inside of the frame A' so that the said movable frame can have none other than a vertical movement.

S and S' are two cone shaped rollers, each roller having ribs placed at an equal distance apart from each other and having an uniform taper from the base to the apex of the cone, so as to form what may be termed a conical cog wheel. Each of these cones is secured to a spindle m which turns at the top on the point of a set screw on the outer end of the bracket T, one of which is secured to one side and the other to the opposite side of the movable frame of the machine, the lower ends of the spindles turning on the points of studs q q which screw into the platform R of the movable frame.

The spindle of the cone wheel is furnished with a cog wheel U and the spindle of the cone wheel S' with a similar cog wheel U'. Both of these wheels gear into a similar cog wheel V on a pin attached to the platform R to which pin is jointed a plate W having two pins, on one of which turns the cog wheel X and on the other the cog wheel Y.

A worm wheel 2 is secured to the upper end of a shaft 3 which turns at the top in a bracket 4 secured to the platform D of the permanent frame and at the bottom in a cross bar 5 attached to the same frame. On the driving shaft and adjacent to the cam G is an inclined flange or portion of a worm x, Figs. 2 and 4, which gears into the worm wheel 2 and turns the latter to the extent of one tooth for every revolution of the driving shaft. On this shaft 3 is a cog wheel 6 of the same diameter as those above referred to, this cog wheel having a key arranged to fit into a feather cut the whole length of the shaft so that the wheel can slide over the same when the movable platform is raised, the wheel however being incapable of turning independently of the shaft.

A horizontal shaft 7 turns in suitable boxes 8, 8, on the base E and is furnished with two bevel wheels 9 and 10 the latter gearing into a bevel wheel 11 on the screwed shaft 12 which turns in the permanent frame A' and which screws into a projection 13 on the plate Q' of the movable frame, the wheel 9 gearing into a wheel 14 on a screwed shaft turning in the opposite side of the permanent frame and screwing into a projection on the plate Q of the movable frame so that the latter may be raised and lowered at pleasure by turning the horizontal shaft 7.

On turning the driving shaft F in the direction of the arrow the cam acting on the arm H will raise the latter and allow it to fall thus causing the heads L L' of the hammer to strike a succession of blows on the anvil, the cam being of such a form that the hammer rises the moment after the blow is given. As the driving shaft continues to revolve in the direction pointed out the wheels 6, X, Y, V and U and U' and consequently the conical cog wheels S and S' will revolve in the direction pointed out by their arrows.

Prior to the saw being submitted to the machine a nice adjustment of several of the parts is necessary. Firstly, the movable frame and its conical cog-wheels S and S' must be raised or lowered to such a position in respect to the platform P on which the saw blade is placed that the portion of the ribs with which the saw blade comes in contact shall be of the same pitch as the teeth on the blade. Thus if the teeth of the saw are coarse the conical wheels must be raised to the point where their ribs will be of the same pitch as the coarse teeth of the saw. If the teeth of the saw are fine however, the conical cog wheels must be lowered until their ribs will gear properly into these fine teeth. Secondly, a nice lateral adjustment of the two heads of the hammer in respect to each other and to the conical cog wheels S S' is necessary in order to insure the heads L and L' of the hammer, striking the edge of the saw at the proper points, for it should be understood that these two heads have to strike two teeth simultaneously leaving one tooth of the saw between the teeth thus struck to be bent after the reversal of the blade. This nice adjustment is obtained by the set screws c, by unscrewing one and screwing the other of which the two heads may be adjusted laterally to the proper position, while the heads of the hammer may be adjusted in respect to each other by unscrewing or screwing the set screws d and e. Thirdly, a nice adjustment of the platform P, is necessary in order to give it the proper inclination for on this depends the extent of the bend or set imparted to the teeth of the saw. This adjustment is obtained by the above mentioned plates or projections F which are attached to or form a part of the platform P and serve to secure the latter to the permanent frame of the machine. These plates having slots through which the screws pass into the frame it will be evident that after slackening these screws the front edge of the platform may be raised or lowered at pleasure, the back edge resting on the frame. The fourth necessary adjustment is that of the guide plates p and p' which have to be moved to suit the position of the cone wheels S and S'.

As the driving shaft revolves the saw blades are pushed along the platform from the right to the left of the same the teeth being pressed lightly against the guide plates p and p' and there held while the ribs, or teeth, of the conical wheels gearing into the teeth of the saw blade drag the latter along and push it over the anvil as the heads of the hammer strike the teeth and give them the necessary set—two lugs y y at the rear of the anvil preventing the edge of the saw blade from being pushed too far inward as it passes from one conical wheel to the other.

When the saw blade has passed the wheel S it is drawn forward by the wheel S' until the whole of the blade has passed over the anvil and been submitted to the action of the hammer. A succession of blades may be thus operated on, the platform being of such a length that a number may be laid on it, end to end.

By the above operation every alternate tooth has received the desired set and the saw blades must be now turned over. For the sake of convenience they are passed along the platform in a direction contrary to that above mentioned the conical wheels being reversed by simply moving the plate W and thus causing the wheels X and Y to assume the position shown by the red circles, Fig. 4, when the wheel X will be thrown into gear and the wheel Y out of gear with the wheel 6, thus causing the required reversal of the conical wheels.

It should be understood that the rotary movement of the cone wheels is not uniform but that the curved flange or worm x is of a form to give an intermittent rotary motion to the worm wheel 2 and consequently to the cone wheels thereby causing the saw blade to stop during the moment the blow is given.

It should also be understood that the speed of the cone wheels compared with the rapidity of the blows of the hammer is such that one blow shall strike the teeth 1 and 2 of the saw blade (see diagram Fig. 6) the next blow striking the teeth 2 and 3, the third blow striking the teeth 3 and 4 and so on so that each tooth receives two blows as the blade passes over the anvil.

It will be evident that by using three or more hammer-heads three or more blows may be given to each tooth.

Without confining ourselves to the precise construction of the framework described and illustrated we claim as our invention and desire to secure by Letters Patent—

1. Causing the saw blade to traverse over the anvil by means of the rotating cog wheels S and S' the same being rendered adjustable in respect to the platform P by the devices herein described or by any other equivalent mechanism, for the purpose specified.

2. In combination with the said conical cog wheels two or more hammers moving simultaneously and being so arranged and furnished with such adjusting appliances that the heads of the hammer may be adjusted in respect to each other and to the said conical cog wheels as and for the purpose herein set forth.

3. The platform P secured to the permanent frame and rendered adjustable thereon substantially in the manner and for the purpose herein set forth.

4. The guide plates p and p' arranged in respect to the platform P and rendered adjustable in respect to the conical cog wheels substantially as set forth for the purpose specified.

5. The combination of the adjustable anvil with the conical cog wheels and the hammer.

In testimony whereof, we have signed our names to this specification, in the presence of two subscribing witnesses.

THOS. S. DISSTON.
HENRY DISSTON.

Witnesses:
HENRY HOWSON,
CHARLES E. FOSTER.